A. Wissler.
Harvester Cutter.
Nº 51,380. Patented Dec. 5, 1865.
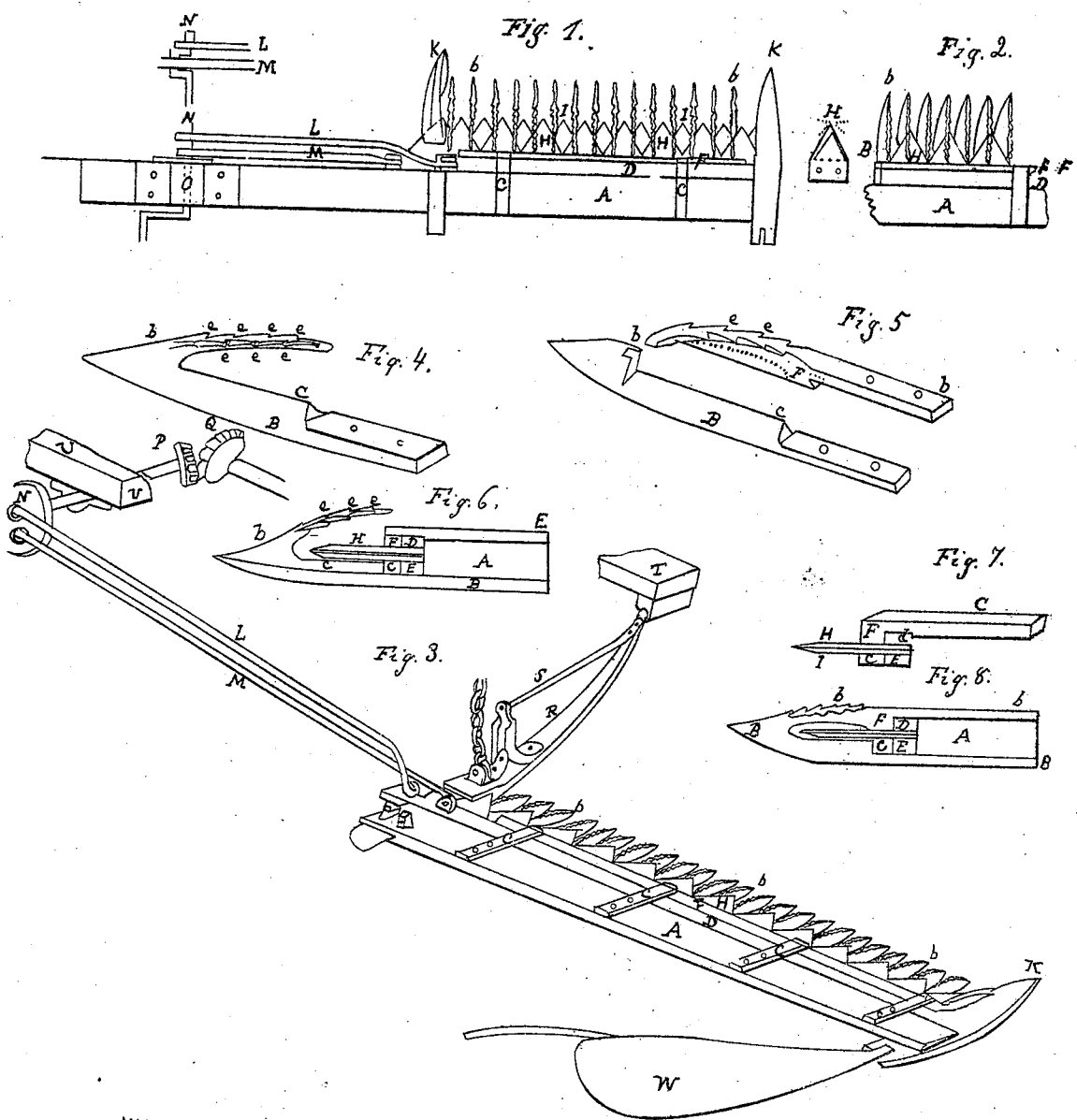
Witnesses.
W. B. Wiley
Jacob Stauffer
Inventor.
Aaron Wissler

UNITED STATES PATENT OFFICE.

AARON WISSLER, OF CLAY TOWNSHIP, LANCASTER COUNTY, PA.

IMPROVEMENT IN GUARDS OR FINGERS FOR HARVESTERS.

Specification forming part of Letters Patent No. 51,380, dated December 5, 1865.

*To all whom it may concern:*

Be it known that I, AARON WISSLER, of Clay township, in the county of Lancaster and State of Pennsylvania, have invented new and useful Improvements on Harvesters and Mowing-Machines; and I do hereby declare that the following is a full, clear, and exact description of the construction and operation of the same, reference being had to the accompanying drawings, making a part of this specification, in which—

Figure 1 illustrates the position of the double series of cutters and fingers or guards, with the double-crank and connecting rods shown on a continuous bar. Fig. 2 shows the cutters or blades, the upper exactly over the lower series, and their points meeting directly in the center of the upper and lower limb of each alternate finger, the other fingers being directly in the angle formed by the contact of two adjoining blades or cutters. Fig. 3 is a perspective view of the cutters, fingers, and finger-bar, &c., in connection with portions of a truck, T U, and gearing in part O P for the crank-pulley N, operating the cutter-bars D E by means of the connecting-rods L M, as applied to the ordinary machine. Fig. 4 is a perspective view of one of the fingers detached; Fig. 5, the same in two pieces—a modification of Fig. 4. Fig. 6 and Fig. 8 are vertical sections of both kinds of fingers or guards, Figs. 4 and 5, in relation to the other bars, &c., employed; Fig. 7, also a modification in part of the same.

The construction of my machine is as follows: I make my cutters four inches wide, which is the base of an equilateral triangle, with square sides, or right-angled base and square sides; the depth of the cutter-bar and bridle-bar F, (or its equivalent,) as shown by H between Fig. 1 and Fig. 2. These blades may be made five or six inches wide, which will still reduce the motion, as it lengthens the cutting-edge. These may be riveted, or, better, fastened with screws neatly countersunk on the cutter-bars D E, the lower bar requiring one (or one and a half may be used) blade more than the upper. The stroke of the crank, being alternate, is but half the length of the width of the cutters employed, whether they be four or six inches wide. Both series of cutters are laid face to face upon the lower bridle or guide bar, G, with the cutter-bars D E against the forward perpendicular side of the finger-bar A, (against which they slide to and fro when in action.) The guide-bar G is riveted to the fingers B, and those are affixed to the lower side of the finger-bar A in the usual manner. These fingers are placed so that from center to center is one-half the width of the blades or cutters in distance—that, is two, two and one-half, or three inches, according to the width of the cutters employed, so, also, adjusted that the points of the blades will come directly in unison between the upper and lower limbs, *b* B, of the fingers alternately, as shown by Fig. 2; hence I employ double the usual number of fingers. Fifteen are shown in Fig. 1 to eight top blades; Fig. 3, twenty-three to thirteen blades, according to the width of the finger-bar or blades used. These fingers have the under limb beveled up to an edge centrally, to prevent any loose grass or stems from being lodged under the cutters, and as they come in close contact with the blades or cutters with their roof-like edge or ridge, no actual friction is occasioned. The upper limb, *b*, whether continuous with the lower limb, B, or made in two separate pieces, as in Figs. 4, 5, is provided with ratchet-like teeth *e* over the blades. The blades are also prevented from being forced apart by a bridle or guide bar, F, or its equivalent. This guide or bridle bar F is held by cross-straps *c*, secured to the top of the finger-bar A, and can be adjusted by underlaying these straps, if the bar F rests too closely upon the blades. These straps C may also be made by uniting F with them, and as the blades are all united firmly to the cutter-bar D, a pressure or stay would be given to them at the points of contact; hence I also contemplated to form my fingers as shown by Fig. 8, which would substitute *b* for F and C, but prefer a continuous guide or bridle bar F, as shown, and the fingers like in Fig. 4.

The operation of my device is such that by means of a double crank, N, and adjustable or ordinary connecting-rods L M, driven by any kind of gearing in use, reduced, however, in the motion, as already stated, both series of cutters, H I, are alternately drawn in and pushed out, sliding between the upper and lower bridle or guide bars F G, or their equivalent, forming an open slot or space between them, cutting shear-fashion in their forward motion by the movement of the machine as it is drawn forward by the horses, thus cutting twice the length of the cutting-edge and twice to each revolution of the crank, leaving a surplus of surface of nearly one-third—that is, a driving-wheel three feet in diameter will go nearly nine and one-half feet in one revolution. Four-inch blades will cut eight inches in each motion, or sixteen inches in each revolution of the crank, or twelve feet in nine revolutions of the crank to one of the traction or driving wheel; hence nine motions are sufficient, leaving ample surplus for the wear of the blades down to three inches cutting-edge. The power required is consequently reduced down to one-fourth of that needed for single cutters, with twenty-two or more motions to each revolution of the driver. The stems of grain or grass, if they yield at all, are arrested by the sides of the fingers, over the center of which the cutting must be effected, and to prevent yielding by the forward motion of the cutters the notches or teeth *e* are cut in the upper limb of the fingers to prevent such giving. The result is that a clear, easy cut is secured without fear of choking or retarding the work.

These double series of blades are applicable to any ordinary reaping or mowing machine.

The cutting-blades might also be in a continuous piece, as those in ordinary use; but I prefer separate blades, for the reason that they can be more readily replaced or sharpened, as well as otherwise advantages arising in their use.

While I am aware that double cutters and double cranks have been employed, however differently arranged, they form no part of the claims; neither do I claim those features independently considered, nor any special gearing or machine to operate my cutters.

What I claim as my invention, and desire to secure by Letters Patent, is—

The construction and arrangement of the guards or fingers B *b*, with teeth *e*, and beveled or sharp edge C, substantially in the manner and for the purpose specified.

AARON WISSLER.

Witnesses:
 WM. B. WILEY,
 JACOB STAUFFER.